United States Patent
Enomoto et al.

(10) Patent No.: US 12,441,291 B2
(45) Date of Patent: Oct. 14, 2025

(54) ELECTRIC MOVING MACHINE

(71) Applicant: HONDA MOTOR CO., LTD., Tokyo (JP)

(72) Inventors: Takayuki Enomoto, Wako (JP); Yasuhiro Nakada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 355 days.

(21) Appl. No.: 17/980,078

(22) Filed: Nov. 3, 2022

(65) Prior Publication Data
US 2023/0202450 A1    Jun. 29, 2023

(30) Foreign Application Priority Data

Dec. 27, 2021  (JP) ................................. 2021-212929

(51) Int. Cl.
  *B60W 10/08*   (2006.01)
  *B60W 10/02*   (2006.01)
  *B60W 50/029*  (2012.01)

(52) U.S. Cl.
  CPC ............ *B60W 10/08* (2013.01); *B60W 10/02* (2013.01); *B60W 50/029* (2013.01); *B60W 2050/0295* (2013.01)

(58) Field of Classification Search
  CPC ..... B60W 10/08; B60W 10/02; B60W 50/029
  See application file for complete search history.

(56) References Cited

U.S. PATENT DOCUMENTS

2013/0345918 A1*  12/2013  Ozaki ................... H02K 7/116
                                                        701/22

FOREIGN PATENT DOCUMENTS

| JP | 2012-186929 A |   | 9/2012  |           |
|----|---------------|---|---------|-----------|
| JP | 2020-162253   |   | 10/2020 |           |
| JP | 2020162253 A  | * | 10/2020 | B60L 3/0023 |

OTHER PUBLICATIONS

Japanese Office Action dated Apr. 11, 2023, Japanese Application No. 2021-212929, 4 pages.

* cited by examiner

*Primary Examiner* — Luke Huynh
(74) *Attorney, Agent, or Firm* — Rankin, Hill & Clark LLP (57) ABSTRACT

Provided is an electric moving machine including: a plurality of wheels provided to a vehicle body; traveling motors each provided for the corresponding wheel and configured to drive the corresponding wheel; and a driving-unit control device configured to control driving of each of the traveling motors, in which the driving-unit control device, in a case in which an error is detected in one or some of the traveling motors during traveling, stops the traveling motors with an error detected, determines a combination of traveling motors to improve a balance of driving force in a traveling direction which broke due to the stopping of the traveling motors, and controls, based on the combination, driving of each of the traveling motors with no error detected.

8 Claims, 6 Drawing Sheets

| NUMBER OF ERRORS | No. | TRAVELING MOTOR OPERATION STATE [X:ERROR OCCURRING] | | | | BALANCE IMPROVING COMBINATION [O:DRIVE, X:FORCIBLE STOP] | | | | DESCRIPTION |
|---|---|---|---|---|---|---|---|---|---|---|
| | | RIGHT FRONT | LEFT FRONT | RIGHT REAR | LEFT REAR | RIGHT FRONT | LEFT FRONT | RIGHT REAR | LEFT REAR | |
| 0 | 1 | | | | | O | O | O | O | ALL-WHEEL DRIVE |
| 1 | 2 | X | | | | X | X | O | O | REAR-WHEEL DRIVE |
| 1 | 3 | | X | | | X | X | O | O | REAR-WHEEL DRIVE |
| 1 | 4 | | | X | | O | O | X | X | FRONT-WHEEL DRIVE |
| 1 | 5 | | | | X | O | O | X | X | FRONT-WHEEL DRIVE |
| 2 | 6 | X | X | | | X | X | O | O | REAR-WHEEL DRIVE |
| 2 | 7 | X | | X | | X | O | X | X | LEFT-FRONT DRIVE |
| 2 | 8 | X | | | X | X | O | X | X | LEFT-FRONT DRIVE |
| 2 | 9 | | X | X | | O | X | X | X | RIGHT-FRONT DRIVE |
| 2 | 10 | | X | | X | O | X | X | X | RIGHT-FRONT DRIVE |
| 2 | 11 | | | X | X | O | O | X | X | FRONT-WHEEL DRIVE |
| 3 | 12 | X | X | X | | X | X | X | O | LEFT-REAR DRIVE |
| 3 | 13 | X | X | | X | X | X | O | X | RIGHT-REAR DRIVE |
| 3 | 14 | X | | X | X | X | O | X | X | LEFT-FRONT DRIVE |
| 3 | 15 | | X | X | X | O | X | X | X | RIGHT-FRONT DRIVE |
| 4 | 16 | X | X | X | X | X | X | X | X | ALL-WHEEL FORCIBLE STOP |

| NUMBER OF ERRORS | No. | TRAVELING MOTOR OPERATION STATE [X:ERROR OCCURRING] | | | | BALANCE IMPROVING COMBINATION [O:DRIVE, X:FORCIBLE STOP] | | | | DESCRIPTION |
|---|---|---|---|---|---|---|---|---|---|---|
| | | FRONT | LEFT | RIGHT | REAR | FRONT | LEFT | RIGHT | REAR | |
| 0 | 1 | | | | | O | O | O | O | ALL-WHEEL DRIVE |
| 1 | 2 | X | | | | X | O | O | O | LEFT-RIGHT-REAR DRIVE |
| | 3 | | X | | | O | X | X | O | FRONT-REAR DRIVE |
| | 4 | | | X | | O | X | X | O | FRONT-REAR DRIVE |
| | 5 | | | | X | O | O | O | X | FRONT-LEFT-RIGHT DRIVE |
| 2 | 6 | X | X | | | X | X | X | O | REAR DRIVE |
| | 7 | X | | X | | X | X | X | O | REAR DRIVE |
| | 8 | X | | | X | X | O | O | X | LEFT-RIGHT DRIVE |
| | 9 | | X | X | | O | X | X | O | FRONT-REAR DRIVE |
| | 10 | | X | | X | O | X | X | X | FRONT DRIVE |
| | 11 | | | X | X | O | X | X | X | FRONT DRIVE |
| 3 | 12 | X | X | X | | X | X | X | O | FRONT DRIVE |
| | 13 | X | X | | X | X | X | O | X | RIGHT DRIVE |
| | 14 | X | | X | X | X | O | X | X | LEFT DRIVE |
| | 15 | | X | X | X | O | X | X | X | FRONT DRIVE |
| 4 | 16 | X | X | X | X | X | X | X | X | ALL-WHEEL FORCIBLE STOP |

ELECTRIC MOVING MACHINE

INCORPORATION BY REFERENCE

The present application claims priority under 35 U.S.C. § 119 to Japanese Patent Application No. 2021-212929 filed on Dec. 27, 2021. The content of the application is incorporated herein by reference in its entirety.

BACKGROUND OF THE INVENTION

Field of the Invention

The present invention relates to an electric moving machine.

Description of the Related Art

There have been known electric vehicles including pairs of right and left wheels at the front and rear of the vehicle body and also including a first motor that outputs driving force to the axle of the pair of right and left front wheels and a second motor that outputs driving force to the axle of the pair of right and left rear wheels (for example, refer to Japanese Patent Laid-Open No. 2020-162253).

SUMMARY OF THE INVENTION

The conventional electric vehicle has a problem in that in the case in which either the first or the second motor fails, the moving capability degrades significantly, making traveling difficult.

Note that such a problem not only occurs in vehicles but also occurs in common in electric moving machines that move by a plurality of motors driving a plurality of wheels.

An object of the present invention is to provide an electric moving machine that can continue stable traveling.

An aspect of the present invention is an electric moving machine including: a plurality of wheels provided to a vehicle body; traveling motors each provided for the corresponding wheel and configured to drive the corresponding wheel; and a driving-unit control device configured to control driving of each of the traveling motors, in which the driving-unit control device, in a case in which an error is detected in one or some of the traveling motors during traveling, stops the traveling motors with an error detected, determines a combination of traveling motors to improve a balance of driving force in a traveling direction which broke due to the stopping of the traveling motors, and controls, based on the combination, driving of the traveling motors with no error detected.

With an aspect of the present invention, it is possible to continue stable traveling.

DETAILED DESCRIPTION OF THE PREFERRED EMBODIMENTS

Hereinafter, embodiments of the present invention will be described with reference to the drawings. In the following, an electric moving machine according to the present invention will be described based on an example of an autonomous driving vehicle that autonomously travels to destinations.

Note that in the following description, the directions that the terms "forward" and "backward" indicate correspond to the "forward direction" and the "backward direction" of the vehicle, and the directions that the terms "up" and "down" indicate correspond to "the vertically upward direction" and "the vertical downward direction". The directions that the terms "left" and "right" indicate correspond to the left direction and the right direction orthogonal to the front-rear direction of the vehicle in plan view from above.

First Embodiment

Figure 1:
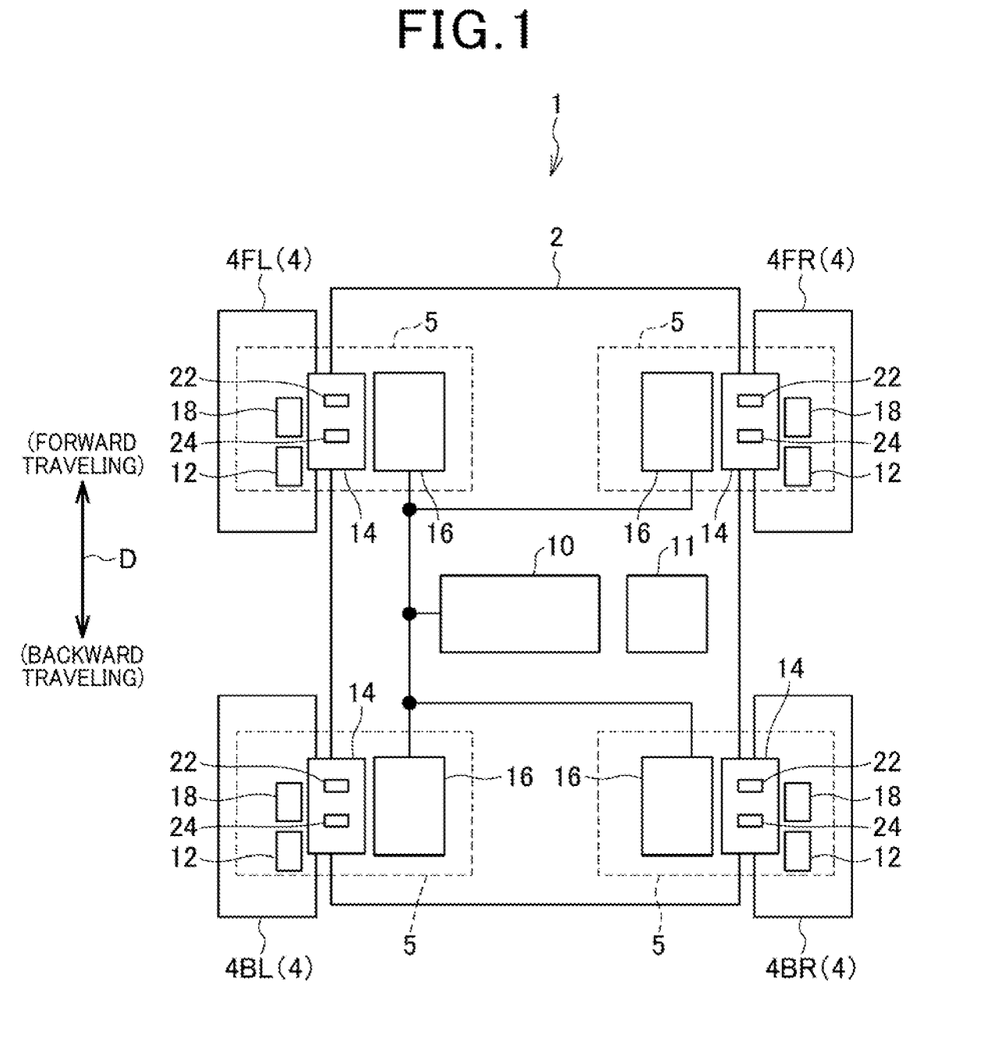
FIG. 1 is a diagram schematically showing the configuration of an autonomous driving vehicle according to a first embodiment of the present invention.

FIG. 1 is a diagram schematically showing the configuration of an autonomous driving vehicle 1 according to the present embodiment.

The autonomous driving vehicle 1 includes a vehicle body 2 that is approximately rectangular in plan view and provided with a pair of right and left front wheels 4FR and 4FL at front portions of the vehicle body 2 and a pair of right and left rear wheels 4BR and 4BL at rear portions of the vehicle body 2, and thus, the autonomous driving vehicle 1 is what is called a four-wheeled vehicle. Note that when these front wheels 4FR and 4FL and rear wheels 4BR and 4BL do not need to be distinguished from one another, they will be simply called the wheels 4.

The autonomous driving vehicle 1 includes driving units 5 provided for the respective four wheels 4, a driving-unit control ECU (electronic control unit) 10 that controls these driving units 5, and a battery 11 that supplies DC electric power to the driving units 5.

Each driving unit 5, which is a part that drives the corresponding wheel 4 with electric power of the battery 11, includes a steering device 12, a traveling motor 14, an inverter 16, and a clutch 18.

The steering device 12 is a device that has a steering actuator for changing the orientation of the corresponding wheel 4. The traveling motor 14 is a motor that outputs driving force to the rotation shaft of the corresponding wheel 4 via the clutch 18. The inverter 16 is a device that converts (for example, DC-AC conversion) the DC electric power of the battery 11 into electric power suitable for the specification of the traveling motor 14 and applies the electric power after the conversion to the traveling motor 14 to drive the traveling motor 14. The clutch 18 is a device that connects and disconnects the force transmission between the output shaft of the traveling motor 14 and the rotation shaft of the wheel 4 according to instructions from the driving-unit control ECU 10.

As described above, since the autonomous driving vehicle 1 of the present embodiment has the driving units 5 provided for the respective wheels 4, each wheel is driven independently.

The autonomous driving vehicle 1 of the present embodiment also has sensors 22 provided for the respective traveling motors 14. The sensor 22 is a device capable of detecting a physical quantity from which an error of the traveling motor 14 during operation can be determined and outputs detection values to the driving-unit control ECU 10. Examples of the sensor 22 include a temperature sensor that detects heat generation of the traveling motor 14 and a current sensor that detects the current value flowing through the traveling motor 14.

Further, the autonomous driving vehicle 1 of the present embodiment has self-diagnosis devices 24 provided for the respective traveling motors 14. The self-diagnosis device 24 is a device that diagnoses whether an error of the corresponding traveling motor 14 has disappeared. The self-diagnosis device 24 of the present embodiment monitors the detection value of the sensor 22 for the traveling motor 14 with an error detected, judges whether the error has disappeared based on the detection value, and outputs the judgment result to the driving-unit control ECU 10. For example, in the case in which an error is a temperature error or a current error, when the temperature or the current value returns within the normal range, the self-diagnosis device 24 judges that the error has disappeared.

The driving-unit control ECU 10 has a computer including a processor such as a central processing unit (CPU) or a micro-processing unit (MPU), a memory device such as read only memory (ROM) and random access memory (RAM), a storage device such as a hard disk drive (HDD) or a solid state drive (SSD), and an interface circuit for connecting the driving units 5 (in particular, the inverters 16, the clutches 18, the sensors 22, and the like). Then, the processor executes a program stored in the memory device or the storage device so that the driving-unit control ECU 10 implements various functional configurations for controlling the driving units 5.

Note that the autonomous driving vehicle 1, in addition to the configuration shown in FIG. 1, includes various components used for autonomous driving. Examples of these components include a vehicle-position detection device, a periphery detection device that detects the peripheral conditions around the autonomous driving vehicle 1 (spaces for traveling, traffic signs, and various objects such as obstacles), a storage device that stores map information, a computation device that determines travel routes, and a control device that controls autonomous driving.

The autonomous driving vehicle 1 is not limited to a passenger vehicle but may be used for, for example, an uncrewed transportation vehicle that transports loads to destinations.

Figure 2:
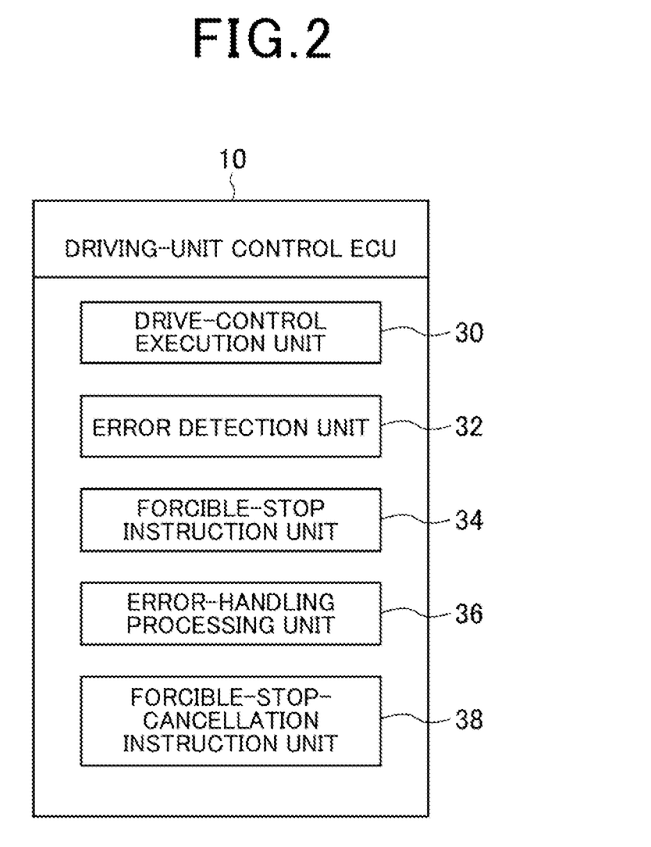
FIG. 2 is a diagram showing the functional configuration of a driving-unit control ECU.

FIG. 2 is a diagram showing the functional configuration of the driving-unit control ECU 10.

The driving-unit control ECU 10 includes a drive-control execution unit 30, an error detection unit 32, a forcible-stop instruction unit 34, an error-handling processing unit 36, and a forcible-stop-cancellation instruction unit 38.

The drive-control execution unit 30 controls the driving units 5, based on instructions from a control device (not shown) that controls traveling of the autonomous driving vehicle 1. This control includes, for example, output control of the traveling motors 14 and steering control of the steering devices 12.

The error detection unit 32 detects errors in the traveling motors 14 while the autonomous driving vehicle 1 is traveling, based on the detection values of the sensors 22 of the traveling motors 14. Specifically, such a threshold value that an error is considered to be occurring in the traveling motor 14 ("hereinafter, an operational error threshold") is stored in a memory device or the like of the driving-unit control ECU 10 in advance, and the error detection unit 32 compares the detection value of the sensor 22 with the operational error threshold to detect an error of the traveling motor 14. In the present embodiment, heat generation errors, current errors, and the like are detected as such errors.

In the case in which the error detection unit 32 detects an error in one or some of the traveling motors 14 during operation, the forcible-stop instruction unit 34 instructs the drive-control execution unit 30 to stop driving the traveling motors 14 with an error detected. Since the drive-control execution unit 30 stops driving the traveling motors 14 according to this instruction, driving of the traveling motors 14 with an error detected is forcibly stopped even if the autonomous driving vehicle 1 is traveling.

In the case of stopping driving the traveling motors 14 according to the instruction of the forcible-stop instruction unit 34, the drive-control execution unit 30 controls the clutches 18 associated with the traveling motors 14 to disconnect the force transmission between the traveling motors 14 and the wheels 4. However, the drive-control execution unit 30 continues steering control of the wheels 4 associated with the forcibly stopped traveling motors 14 so that the autonomous driving vehicle 1 can travel in a traveling direction D (FIG. 1). With this operation, since the wheels 4 can idle, and the wheels 4 will not cause resistance to traveling, this prevents decrease in the traveling ability.

Depending on which wheels 4 the traveling motors 14 forcibly stopped are associated with, the error-handling processing unit 36 executes a process of changing driving of the remaining wheels 4. Specifically, the error-handling processing unit 36 determines the combination of traveling motors 14 to improve the balance of the driving force in the traveling direction D (the forward direction and the backward direction) that broke due to the forcible stop of the traveling motors 14. The error-handling processing unit 36 instructs the drive-control execution unit 30 to drive only the traveling motors 14 (the wheels 4) included in this combination and to stop driving the other traveling motors 14 so that the wheels 4 corresponding thereto can idle. This operation enables the autonomous driving vehicle 1 to travel stably in the traveling direction D.

Note that hereinafter a "combination of traveling motors 14 to improve the balance of the driving force in the traveling direction D" is simply referred to as a "balance improving combination". Specific examples of this balance improving combination will be described later.

The forcible-stop-cancellation instruction unit 38 judges whether the errors of the forcibly stopped traveling motors 14 have disappeared, based on the diagnosis results of the self-diagnosis devices 24 of the traveling motors 14, and if the errors have disappeared, the forcible-stop-cancellation instruction unit 38 instructs the drive-control execution unit 30 to cancel the forcible stop. The drive-control execution unit 30, if the cancellation of the forcible stop is instructed, resumes driving the forcibly stopped traveling motors 14. With this configuration, when the traveling motors 14 recover from errors, driving of the traveling motors 14 is resumed in a rapid manner, and this reduces the impact on the travel.

Figure 3:
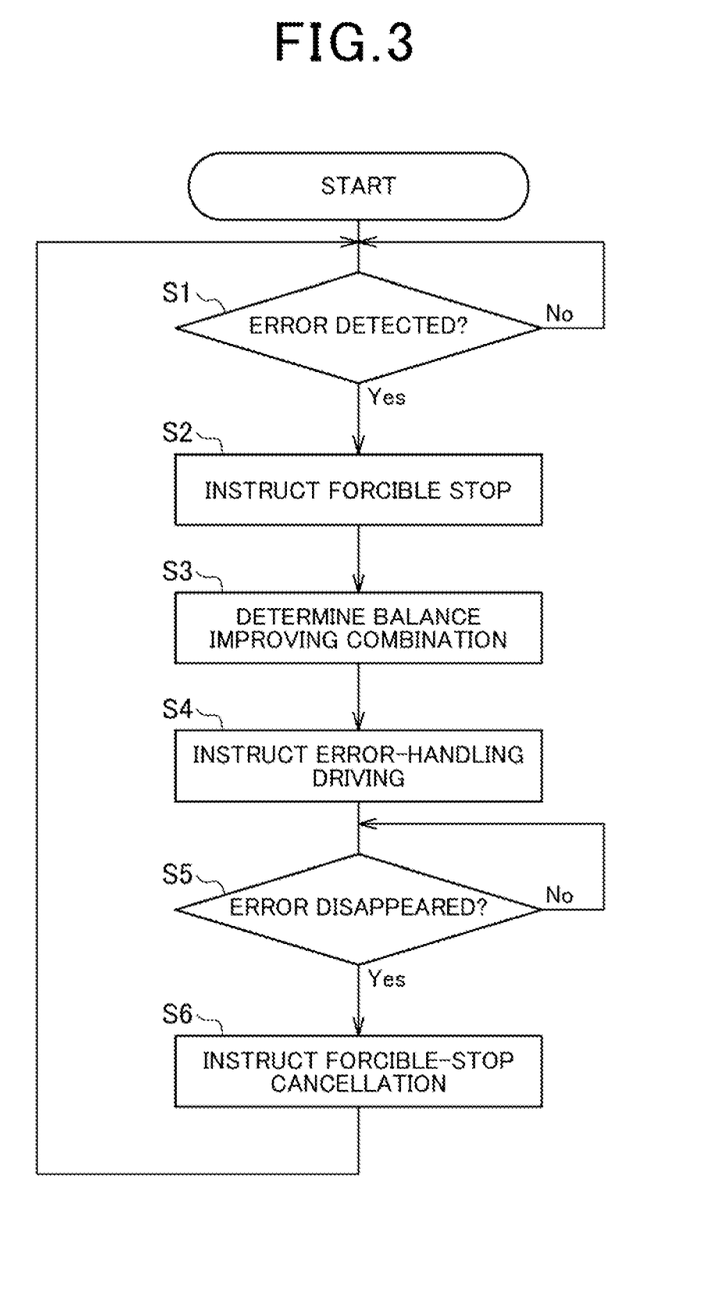
FIG. 3 is a flowchart showing operation of the driving-unit control ECU.

FIG. 3 is a flowchart showing operation of the driving-unit control ECU 10.

The error detection unit 32 of the driving-unit control ECU 10 monitors the detection value of the sensor 22 of each traveling motor 14 while the autonomous driving vehicle 1 is traveling and judges whether an error has been detected in one or some of the traveling motors 14 (step S1).

If the error detection unit 32 detects an error (step S1: Yes), the forcible-stop instruction unit 34 instructs the drive-control execution unit 30 to forcibly stop the traveling motors 14 with an error detected (step S2). Thus, the drive-control execution unit 30 stops driving the traveling motors 14 with an error detected and disconnects the force transmission by the clutches 18, putting the traveling motor 14 in an idling state.

Next, the error-handling processing unit 36 determines the balance improving combination described above (step S3) and instructs the drive-control execution unit 30 to drive only the traveling motors 14 included in this balance improving combination and stop driving the other traveling motors 14 so that the wheels 4 corresponding thereto can idle (step S4: an error-handling drive instruction).

After that, the forcible-stop-cancellation instruction unit 38 judges whether the errors of the forcibly stopped traveling motors 14 have disappeared, based on the diagnosis results of the self-diagnosis devices 24 of the traveling motors 14 (step S5), and if the errors have disappeared (step S5: Yes), the forcible-stop-cancellation instruction unit 38 instructs the drive-control execution unit 30 to cancel the forcible stop (step S6).

With these processes, when the current values or the temperatures of one or some of the traveling motors 14 exceed the operational error threshold due to, for example, imbalance of the loads while the autonomous driving vehicle 1 is traveling, driving of the traveling motors 14 is immediately forcibly stopped before they fail, and later, when the current values or the temperatures return within the normal range, the forcible stop of the traveling motors 14 are canceled.

This process makes it possible previously to prevent the traveling motors 14 from failing due to the traveling motors 14 keeping operating with current values or temperatures out of the normal range, and it also possible to save the maintenance cost of the traveling motor 14.

Since only the traveling motors 14 included in the balance improving combination are driven while one or some of the traveling motors 14 are forcibly stopped, the autonomous driving vehicle 1 can continue stable traveling, and it is possible to prevent situations of becoming unable to travel in the middle of traveling and to reduce the number of times when the autonomous driving vehicle 1 that has become unable to travel needs to be retrieved or rescued.

Next, the balance improving combination mentioned above will be described.

Figure 4:
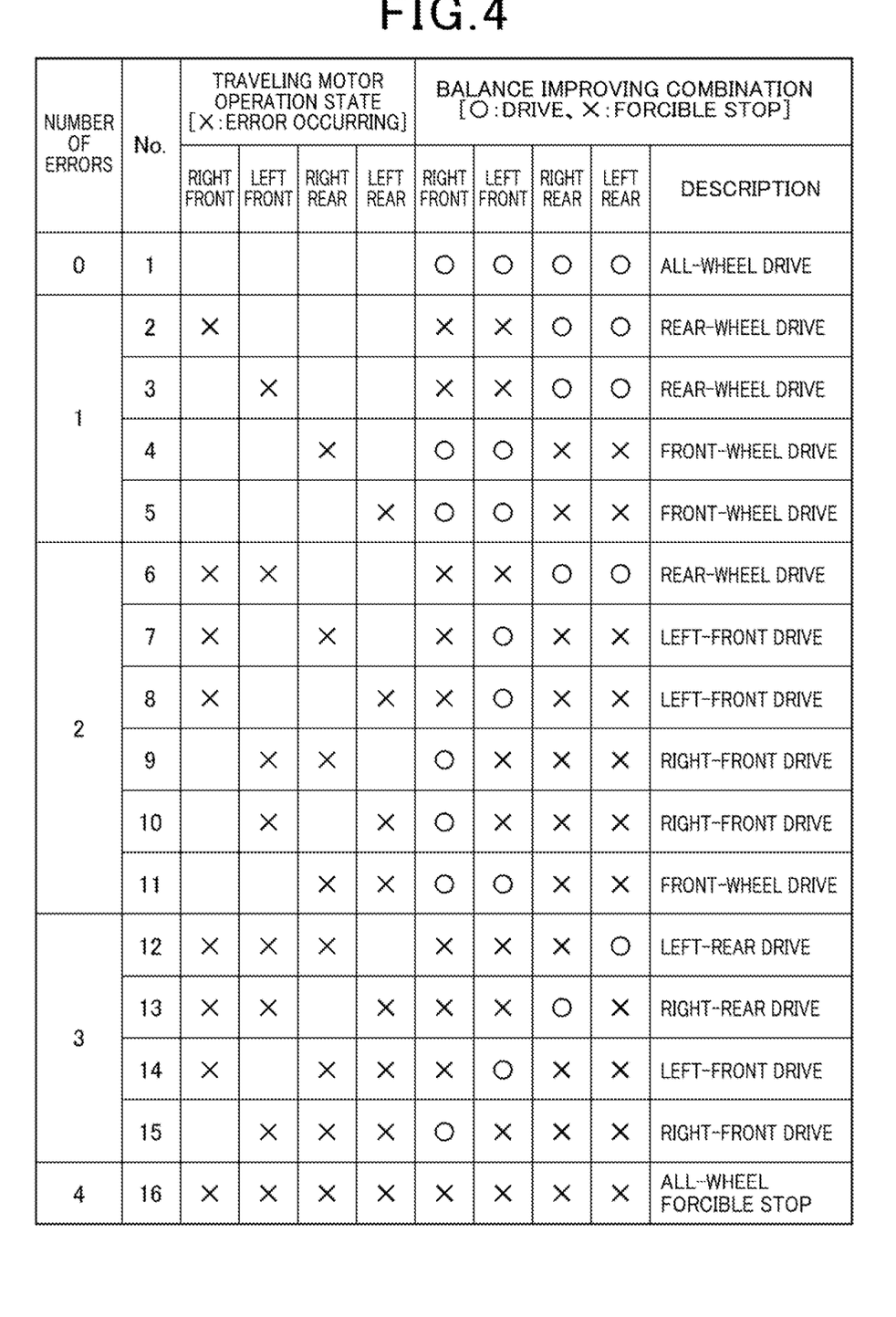
FIG. 4 is a table showing examples of balance improving combinations according to the first embodiment.

FIG. 4 is a table showing examples of balance improving combinations of the autonomous driving vehicle 1. Note that in the table, the number of errors means the number of traveling motors 14 with an error detected.

As shown in the table, in the autonomous driving vehicle 1, unless an error occurs in all of the traveling motors 14, in other words, unless the number of errors is "4" (FIG. 4: No. 16), one or some of traveling motors 14 are driven, and the traveling continues. To improve the balance of the driving force in the traveling direction D, the balance improving combinations include combinations in which a traveling motor 14 with no error detected is stopped to achieve both the propulsion capability (horsepower) and the stability.

Specifically, the case in which the number of errors is "1" indicates the state in which an error is detected in one of the traveling motors 14 driving the wheels 4 on one side of the right and left sides and no error is detected in any of the traveling motors 14 driving the wheels 4 on the other side.

In this case, to improve the balance of the driving force, the driving-unit control ECU 10 stops driving one of the traveling motors 14 driving the wheels 4 on the other side.

For example, in the case in which the traveling motor 14 with an error occurring is a motor driving either the front wheel 4FR or 4FL, the driving-unit control ECU 10 forcibly stops all of the traveling motors 14 associated with the front wheels 4FR and 4FL, and the traveling continues by driving the traveling motors 14 associated with the rear wheels 4BR and 4BL (FIG. 4: No. 2 and No. 3). In the case in which the traveling motor 14 with an error occurring is a motor driving either the rear wheel 4BR or 4BL, the driving-unit control ECU 10 forcibly stops all of the traveling motors 14 associated with these rear wheels 4BR and 4BL, and the traveling continues by driving the traveling motors 14 associated with the front wheels 4FR and 4FL (FIG. 4: No. 4 and No. 5).

Since a traveling motor 14 with no error detected is forcibly stopped in these balance improving combinations, although the propulsion capability is decreased, the balance of the driving force is improved, and this stabilizes the traveling.

In the case in which the number of errors is "2", it indicates the following two states.

The first state is a state in which an error is detected in one of the traveling motors 14 driving the wheels 4 on the left side and one of the traveling motors 14 driving the wheels 4 on the right side.

The second state is a state in which an error is detected in all of the traveling motors 14 driving the wheels 4 on one of the right and left sides, and no error is detected in any of the traveling motors 14 driving the wheels 4 on the other side.

When the first state is occurring, in the case in which the wheels 4 associated with the traveling motors 14 with an error detected are located to be symmetrical with respect to the traveling direction D (line-symmetric in the present embodiment), the balance of the driving force in the traveling direction D does not break even if the traveling motors 14 with an error detected are forcibly stopped, and hence, the driving-unit control ECU 10 continues the traveling without stopping the traveling motors 14 with no error detected to prevent a decrease in the propulsion capability (FIG. 4: No. 6 and No. 11).

On the other hand, in the case in which the wheels 4 associated with the traveling motors 14 with an error detected are not located to be symmetrical with respect to the traveling direction D, the driving-unit control ECU 10 continues driving, out of the traveling motors 14 with no error detected, the traveling motor 14 associated with the wheel 4 located on the traveling direction D side of the vehicle body 2 (the front wheel 4FR and 4FL in forward traveling), and stops the traveling motor 14 associated with the wheel 4 located on the opposite side to the traveling direction D of the vehicle body 2 (the rear wheel 4BR or 4BL in forward traveling) (FIG. 4: No. 8 and No. 9).

Similarly, in the case in which the second state is occurring, the driving-unit control ECU 10 continues driving, out of the traveling motors 14 with no error detected, the traveling motor 14 associated with the wheel 4 located on the traveling direction D side of the vehicle body 2 (the front wheel 4FR or 4FL in forward traveling) and stops the traveling motor 14 associated with the wheel 4 located on the opposite side to the traveling direction D of the vehicle body 2 (the rear wheel 4BR or 4BL in forward traveling) (FIG. 4: No. 7 and No. 10).

As described above, by preferentially driving the wheel 4 located on the traveling direction D (the forward traveling direction or the backward traveling direction) side, it is possible to stabilize the traveling.

Note that in the case in which the number of errors is "3", the driving-unit control ECU 10 forcibly stops all of the traveling motors 14 with an error occurring and drives the remaining one traveling motors 14 to continue traveling (FIG. 4: No. 12 to No. 15).

The present embodiment provides the following effects.

The autonomous driving vehicle 1 of the present embodiment includes the driving-unit control ECU 10 which, when an error is detected in one or some of the traveling motors 14 during traveling, stops the traveling motors 14 with an error detected, determines a combination of the traveling motors 14 to improve the balance of the driving force in the traveling direction D broken due to the stopping of the traveling motors 14, and controls, based on the combination, driving of the traveling motors no error detected.

With this configuration, even if an error is detected in one or some of the traveling motors 14, and therefore the traveling motors 14 with the error are to be stopped, it is possible to continue stable traveling and avoid situations of becoming unable to travel. In addition, since these traveling motors 14 are stopped immediately when the current values or the temperatures exceed the operational error threshold due to, for example, imbalance of the loads, it is possible to avoid failure of the traveling motor 14 and to save the maintenance cost.

In the autonomous driving vehicle 1 of the present embodiment, the combinations of traveling motors to improve the balance of the driving force in the traveling direction D include combinations in which one of the traveling motors with no error detected is stopped.

This configuration makes it possible to achieve both the propulsion capability and the stability by the balance of the driving force.

In the autonomous driving vehicle 1 of the present embodiment, in the case in which an error is detected in one of the traveling motors 14 driving the wheels 4 on one of the right and left sides, and no error is detected in any of the traveling motors 14 driving the wheels 4 on the other side, the driving-unit control ECU 10 stops driving one of the traveling motors 14 driving the wheels 4 on the other side.

This configuration makes it possible to achieve both the propulsion capability and the stability.

In the autonomous driving vehicle 1 of the present embodiment, in the case in which an error is detected in one of the traveling motors 14 driving the wheels 4 on one of the right and left sides and in one of the traveling motors 14 driving the wheels 4 on the other side, and the wheels 4 driven by the traveling motors 14 with an error detected are located to be symmetrical with respect to the traveling direction D, the driving-unit control ECU 10 does not stop the traveling motors 14 with no error detected.

This configuration makes it possible to avoid unnecessary reduction of the propulsion capability.

In the autonomous driving vehicle 1 of the present embodiment, in the case in which the wheels 4 driven by the traveling motors 14 with an error detected are not located to be symmetrical with respect to the traveling direction D, the driving-unit control ECU 10 continues driving, out of the traveling motors 14 with no error detected, the traveling motor 14 associated with the wheel 4 located on the traveling direction D (the forward traveling direction or the backward traveling direction) side and stops the traveling motor 14 associated with the wheel 4 located on the opposite side to the traveling direction D.

This configuration makes it possible to achieve stable traveling in the traveling direction D.

In the autonomous driving vehicle 1 of the present embodiment, in the case in which an error is detected in all of the traveling motors 14 driving the wheels 4 on one of the right and left sides, the driving-unit control ECU 10 continues driving the traveling motor 14 associated with the wheel 4 located on the traveling direction D (the forward traveling direction or the backward traveling direction) side and stops the traveling motor 14 associated with the wheel 4 located on the opposite side to the traveling direction D, out of the traveling motors 14 with no error detected, out of the traveling motors 14 driving the wheels 4 on the other side.

This configuration makes it possible to achieve stable traveling in the traveling direction D.

The autonomous driving vehicle 1 of the present embodiment includes the clutches 18 that disconnect the force transmission between the traveling motors 14 to be stopped and the wheels 4.

With this configuration, since when the traveling motors 14 are stopped, the wheels 4 can idle, it is possible to prevent this wheels 4 from becoming resistance to traveling.

In the autonomous driving vehicle 1 of the present embodiment, when the errors of the traveling motors 14 disappear, the driving-unit control ECU 10 cancels the stopping of the traveling motors 14.

With this process, driving of the traveling motors 14 is resumed, and it is possible to reduce the impact on the travel.

Second Embodiment

Figure 5:
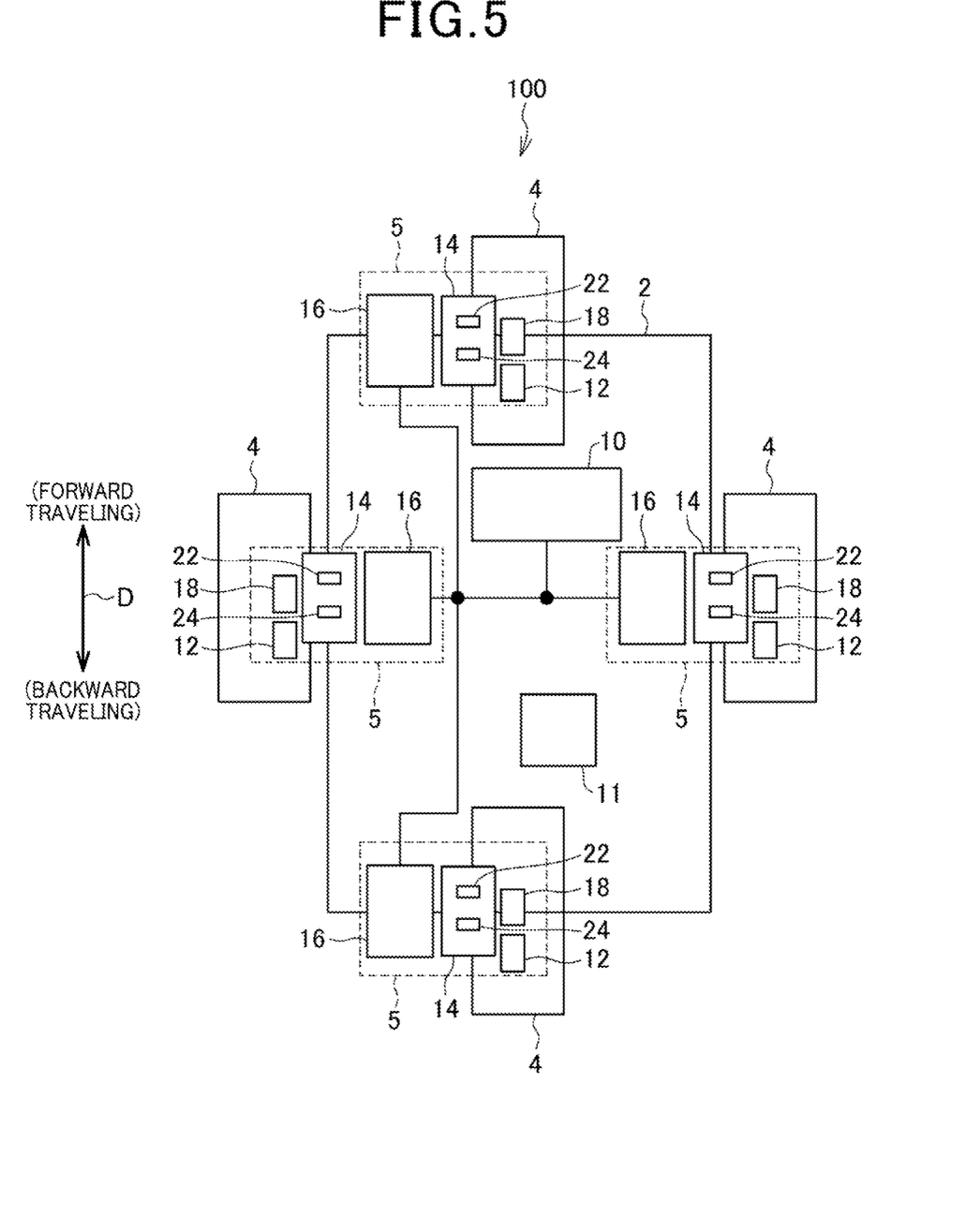
FIG. 5 is a diagram schematically showing the configuration of an autonomous driving vehicle according to a second first embodiment of the present invention.

FIG. 5 is a diagram schematically showing the configuration of an autonomous driving vehicle 100 according to the present embodiment. Note that in this figure, the members described in the first embodiment are denoted by the same symbols, and description thereof is omitted.

The autonomous driving vehicle 100 of the present embodiment is different from the autonomous driving vehicle 1 of the first embodiment in that the arrangement of the four wheels 4 is different. In other words, the arrangement of the wheels 4 of the autonomous driving vehicle 100 makes it possible to continue more stable traveling by driving the remaining traveling motors 14 when one or some of the traveling motors 14 are forcibly stopped. Specifically, in the arrangement of the wheels 4 of the autonomous driving vehicle 100 of the present embodiment, a pair of wheels 4 are arranged at symmetrical positions both in the front-rear direction and in the right-left direction in plan view of the vehicle body 2. In other words, as shown in FIG. 5, the wheels 4 are arranged in an approximately cross shape such that one wheel 4 is located at each of the front portion, the rear portion, the left-side portion, and the right-side portion of the vehicle body 2.

This configuration improves the stability at the time of traveling with one or some of the traveling motors 14 forcibly stopped.

Note that the operation of the driving-unit control ECU 10 in the present embodiment similarly to that of the first embodiment (FIG. 3), and thus description thereof is omitted.

Figure 6:
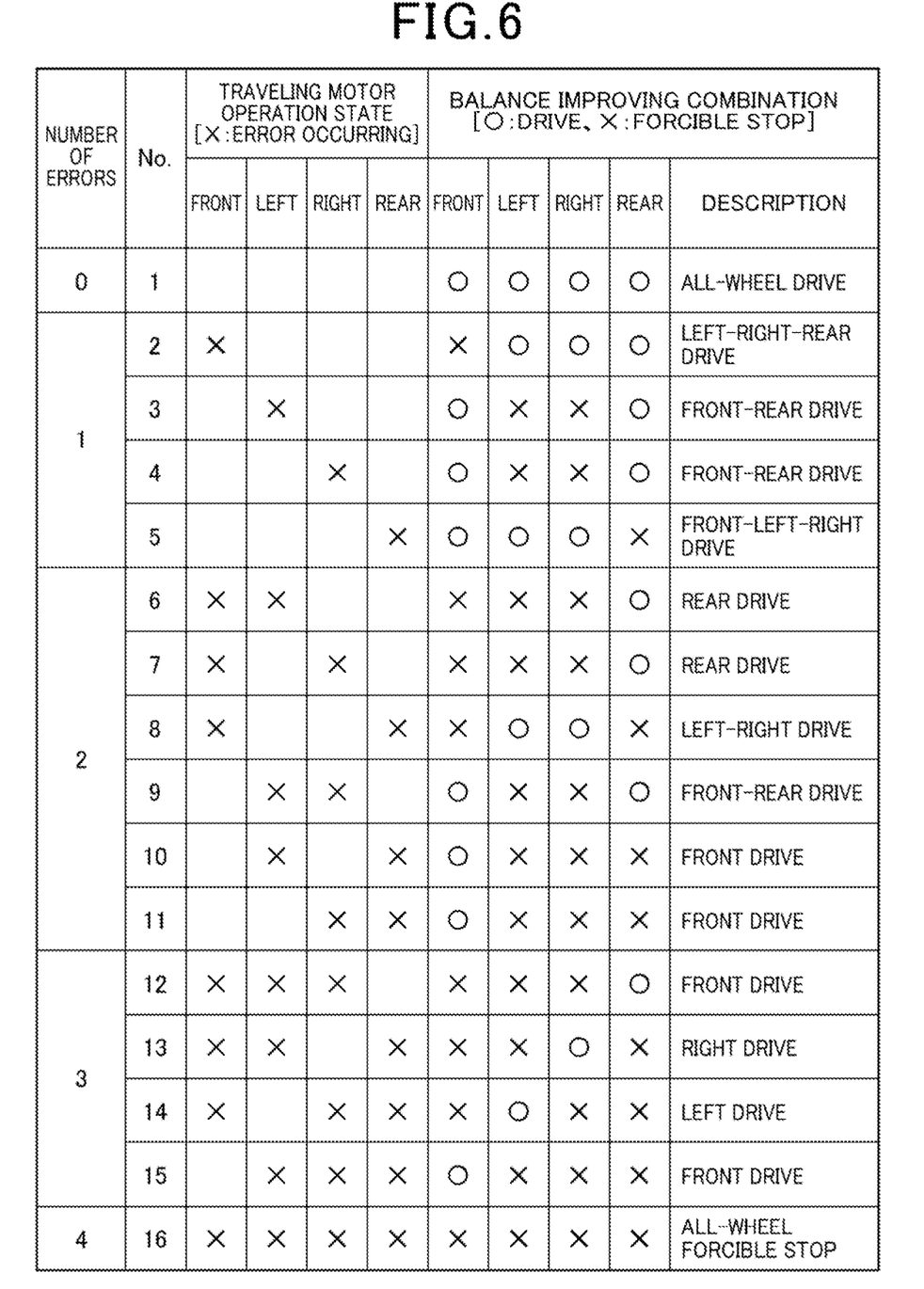
FIG. 6 is a table showing examples of balance improving combinations according to the second embodiment.

FIG. 6 is a table showing examples of the balance improving combinations in the autonomous driving vehicle 100.

As shown in the figure, in the case in which the number of errors is "1", and the traveling motor 14 with an error occurring is either the front wheel 4 or the rear wheel 4, the balance can be kept without forcibly stopping another traveling motor 14 with no error occurring, and hence, the driving-unit control ECU 10 drives all of the traveling motors 14 with no error occurring to continue the traveling (FIG. 6: No. 2 and No. 5).

On the other hand, in the case in which the traveling motor 14 with an error occurring is either the right or the left wheel 4, if this traveling motor 14 is stopped, the balance of the driving force in the traveling direction D breaks. Hence, the driving-unit control ECU 10 keeps operating the traveling motors 14 driving the front and rear wheels 4, forcibly stops all of the right and left traveling motors 14, improves the balance by driving the traveling motors 14 for the front and rear wheels 4, and continues the traveling (FIG. 6: No. 3 and No. 4).

In the case in which the number of errors is "2", and the traveling motors 14 with an error occurring are the motors driving the front and rear wheels 4 or the right and left wheels 4, another traveling motor 14 with no error occurring does not have to be forcibly stopped to keep the balance. Hence, the driving-unit control ECU 10 forcibly stops only these traveling motors 14 with an error occurring, and continues the traveling without forcibly stopping any of the normal traveling motors 14 (FIG. 6: No. 8 and No. 9).

On the other hand, in the case in which the traveling motors 14 with an error occurring are a motor driving either the front or the rear wheel 4 and a motor driving either the right or the left wheel 4, if these traveling motors 14 are stopped, the balance of the driving force in the traveling direction D would break. Hence, to improve the balance of the driving force, the driving-unit control ECU 10 forcibly stops all of the traveling motors 14 except the front or rear normal traveling motor 14 and continues the traveling by driving one wheel (FIG. 6: No. 6, No. 7, No. 10, and No. 11).

In the case in which the number of errors is "3", the driving-unit control ECU 10 forcibly stops all of the traveling motors 14 with an error occurring and continues the traveling by driving the remaining one traveling motor 14 (FIG. 6: No. 12 to No. 15).

In the present embodiment, the number of combinations in which the autonomous driving vehicle 100 travels with either the right or left one wheel 4 is smaller than in the first embodiment. Specifically, in the present embodiment, the number of combinations in which the autonomous driving vehicle 100 travels with either the right or left one wheel 4 (the right drive or the left drive) is "2" (FIG. 6: No 12 and No 14), while in the first embodiment, the number of such combinations is "8" (FIG. 4: No. 7 to No. 10 and No. 12 to No. 15). Thus, in the present embodiment, the number of chances of one-wheel driving in which the balance is relatively unstable is smaller than in the first embodiment.

Note that the above embodiments are mere examples of some aspects of the present invention, and hence modification and application are possible in any way within a range not departing from the spirit of the present invention.

In the above embodiments, the wheels 4 associated with the traveling motors 14 to be stopped can idle by control of the clutches 18. However, the wheels 4 may be configured to idle by control of electrical circuits instead of the clutches 18 which are mechanical mechanisms. Specifically, an electrical circuit such as a switch circuit is provided for each traveling motor 14, the electrical circuit being capable of disconnecting the electrical connection (more precisely, opening the electric power line that transmits the electric power) between the traveling motor 14 and the inverter 16 that supplies the traveling motor 14 with electric power. The driving-unit control ECU 10 controls the electrical circuit associated with the traveling motor 14 to be stopped to disconnect the electrical connection between the traveling motor 14 and the inverter 16 and reduces the rotational resistance on the wheel 4, which is caused by the traveling motor 14 to allow the wheel 4 to idle.

In the above embodiments, when the driving-unit control ECU 10 forcible stops traveling motors 14 during traveling, it may execute the following first control or the second control.

In the first control, the electric power for the traveling motors 14 to be forcibly stopped is gradually reduced, and the electric power for the traveling motors 14 included in the balance improving combination is gradually increased or reduced so that the overall driving force can be changed smoothly not to be discontinuous.

In the second control, the driving-unit control ECU 10 once forcibly stops driving all of the traveling motors 14 and controls the clutches 18 such that all of the traveling motors 14 can idle, and then the driving-unit control ECU 10 gradually increases the electric power for the traveling motors 14 included in the balance improving combination.

The impact on the traveling due to a forcible stop of traveling motors 14 can be reduced by the driving-unit control ECU 10 executing the first control or the second control.

Although the above embodiments shows a vehicle as an exemplary electric moving machine, the electric moving machine is not limited to a vehicle but may be a moving machine including a plurality of wheels 4 and traveling motors 14 provided for the respective wheels 4. As such electric moving machines include autonomous-driving work machines (such as lawn mowers).

Although the above embodiments shows an exemplary case in which each of the right side and the left side of the vehicle body 2 has one or two wheels 4, each side may have three or more wheels 4. The number of wheels 4 provided for the right side and the left side respectively does not necessarily have to be the same.

In the above embodiments, the shape in plan view of the vehicle body 2 is not limited to an approximate rectangle but may be any shape such as a circle or an elliptical shape.

The functional blocks shown in FIGS. 1 and 5 are schematic diagrams in which the constituents of the autonomous driving vehicle 1 or 100 are classified and indicated according to the main processes to make it easy to understand the invention of the present application, and hence, the constituents can also be classified into a larger number of constituents according to the process details. In addition, classification can also be made such that one constituent executes more processes, or conversely, classification can also be made such that a plurality of constituents are put together into one constituent.

For example, in FIGS. 1 and 5, the driving-unit control ECU 10 may include the inverters 16.

Directions such as horizontal and vertical ones and various numerical values, shapes, and materials in the above embodiments, unless otherwise specified, include ranges that provide the same operational advantages as those directions, numerical values, shapes, and materials (what is called the equivalents).

Configurations Supported by Embodiments Described Above

The above embodiments support the following configurations.

(Configuration 1)

An electric moving machine including: a plurality of wheels provided to a vehicle body; traveling motors each provided for the corresponding wheel and configured to drive the corresponding wheel; and a driving-unit control device configured to control driving of each of the traveling motors, in which the driving-unit control device, in a case in which an error is detected in one or some of the traveling motors during traveling, stops the traveling motors with an error detected, determines a combination of traveling motors to improve a balance of driving force in a traveling direction which broke due to the stopping of the traveling motors, and controls, based on the combination, driving of the traveling motors with no error detected.

With configuration 1, even if an error is detected in one or some of the traveling motors, and therefore the traveling motors with the error are to be stopped, it is possible to continue stable traveling and avoid situations of becoming unable to travel.

(Configuration 2)

The electric moving machine according to configuration 1, in which the combinations of traveling motors to improve the balance of the driving force in the traveling direction include a combination in which one or some of the traveling motors with no error detected are stopped.

The configuration 2 makes it possible to achieve both the propulsion capability and the stability by the balance of the driving force.

(Configuration 3)

The electric moving machine according to configuration 2, in which at least two or more of the wheels are provided on each of the right lateral and left lateral sides of the vehicle body, or the wheels are provided on each of the right lateral, left lateral, front, and rear sides of the vehicle body, and the driving-unit control device, in a case in which an error is detected in one or some of the traveling motors driving the wheels on one lateral side, and no error is detected in any of the traveling motors driving the wheels on the other lateral side, stops driving one or some of the traveling motors driving the wheels on the other lateral side.

The configuration 3 makes it possible to achieve both the propulsion capability and the stability.

(Configuration 4)

The electric moving machine according to configuration 3, in which the driving-unit control device, in a case in which an error is detected in one or some of the traveling motors driving the wheels on one lateral side and in one or some of the traveling motors driving the wheels on the other lateral side, and when the wheels driven by the traveling motors with an error detected are located to be symmetrical with respect to the traveling direction, does not stop the traveling motors with no error detected.

The configuration 4 makes it possible to avoid unnecessary reduction of the propulsion capability.

(Configuration 5)

The electric moving machine according to configuration 4, in which the driving-unit control device, in a case in which the wheels driven by the traveling motors with an error detected are not located to be symmetrical with respect to the traveling direction, continues driving the traveling motor associated with the wheel located on the traveling direction side and stops the traveling motor associated with the wheel located on an opposite side to the traveling direction, out of the traveling motors with no error detected.

The configuration 5 makes it possible to achieve stable traveling in the traveling direction.

(Configuration 6)

The electric moving machine according to any one of configurations 3 to 5, in which the driving-unit control device, in a case in which an error is detected in all of the traveling motors driving the wheels on one lateral side, continues driving the traveling motor associated with the wheel located on the traveling direction side and stops the traveling motor associated with the wheel located on an opposite side to the traveling direction, out of the traveling motors with no error detected, out of the traveling motors driving the wheels on the other lateral side.

The configuration 6 makes it possible to achieve stable traveling in the traveling direction.

(Configuration 7)

The electric moving machine according to any one of configurations 1 to 6, further including a clutch that disconnects force transmission between the traveling motors to be stopped and the corresponding wheels.

With the configuration 7, since when the traveling motors are stopped, the wheels can idle, and it is possible to prevent these wheels from becoming resistance to traveling.

(Configuration 8)

The electric moving machine according to any one of configurations 1 to 6, further including: an electrical circuit that disconnects electrical connection between the traveling motors to be stopped and inverters that supply the traveling motors with electric power.

With the configuration 8, since when the traveling motors are stopped, the wheels can idle, and it is possible to prevent these wheels from becoming resistance to traveling.

(Configuration 9)

The electric moving machine according to any one of configurations 1 to 8, in which the driving-unit control device, when an error in a traveling motor disappears, cancels the stopping of the traveling motor.

With the configuration 9, driving of the traveling motor the error of which has disappeared is resumed, and it is possible to reduce the impact on the traveling.

REFERENCE SIGNS LIST

1, 100 autonomous driving vehicle (electric moving machine)
4 wheel
5 driving unit
10 driving-unit control ECU (driving-unit control device)
14 traveling motor
18 clutch
22 sensor
24 self-diagnosis device
30 drive-control execution unit
32 error detection unit
34 forcible-stop instruction unit
36 error-handling processing unit
38 forcible-stop-cancellation instruction unit
D traveling direction

What is claimed is:

1. An electric moving machine comprising:
a plurality of wheels provided to a vehicle body;
traveling motors each provided for the corresponding wheel and configured to drive the corresponding wheel; and
a driving-unit control device that includes a processor and is configured to control driving of each of the traveling motors, wherein
at least two of the wheels are provided on each of a right lateral side of the vehicle body and a left lateral side of the vehicle body,
the driving-unit control device,
in a case in which an error is detected in some of the traveling motors during traveling, stops the traveling motors with an error detected, determines a combination of traveling motors to improve a balance of driving force in a traveling direction which broke due to the stopping of the traveling motors, and as a control, based on the combination, in a case in which an error is detected in one or some of the traveling motors driving of the wheels on the right lateral side and in one or some of the traveling motors driving the wheels on the left lateral side, and when the wheels driven by the traveling motors with an error detected are located to be symmetrical with respect to the traveling direction, does not stop the traveling motors with no error detected.

2. The electric moving machine according to claim 1, wherein
the driving-unit control device,
in a case in which the wheels driven by the traveling motors with an error detected are not located to be symmetrical with respect to the traveling direction, continues driving the traveling motor associated with the wheel located on the traveling direction side and stops the traveling motor associated with the wheel located on an opposite side to the traveling direction, out of the traveling motors with no error detected.

3. The electric moving machine according to claim 1, wherein
the driving-unit control device,
in a case in which an error is detected in all of the traveling motors driving the wheels on one lateral side of the left lateral side and the right lateral side,
continues driving the traveling motor associated with the wheel located on the traveling direction side and stops the traveling motor associated with the wheel located on an opposite side to the traveling direction, out of the traveling motors with no error detected, out of the traveling motors driving the wheels on the other lateral side to the one lateral side.

4. The electric moving machine according to claim 1, further comprising
a clutch that disconnects force transmission between the traveling motors to be stopped and the corresponding wheels.

5. The electric moving machine according to claim 1, further comprising
an electrical circuit that disconnects electrical connection between the traveling motors to be stopped and inverters that supply the traveling motors with electric power.

6. The electric moving machine according to claim 1, wherein
the driving-unit control device,
when an error in a traveling motor disappears, cancels the stopping of the traveling motor.

7. An electric moving machine comprising:
a plurality of wheels provided to a vehicle body;
traveling motors each provided for the corresponding wheel and configured to drive the corresponding wheel; and
a driving-unit control device that includes a processor and is configured to control driving of each of the traveling motors, wherein
at least two of the wheels are provided on each of a right lateral side of the vehicle body and a left lateral side of the vehicle body,
the driving-unit control device,
in a case in which an error is detected in some of the traveling motors during traveling, stops the traveling motors with an error detected, determines a combination of traveling motors to improve a balance of driving force in a traveling direction which broke due to the stopping of the traveling motors, and as a control, based on the combination, in a case in which the wheels driven by the traveling motors with an error detected are not located to be symmetrical with respect to the traveling direction, continues driving the traveling motor associated with the wheel located on the traveling direction side and stops the traveling motor associated with the wheel located on an opposite side to the traveling direction, out of the traveling motors with no error detected.

8. An electric moving machine comprising:
a plurality of wheels provided to a vehicle body;
traveling motors each provided for the corresponding wheel and configured to drive the corresponding wheel; and
a driving-unit control device that includes a processor and is configured to control driving of each of the traveling motors, wherein
at least two of the wheels are provided on each of a right lateral of the vehicle body and a left lateral side of the vehicle body,
the driving-unit control device,
in a case in which an error is detected in some of the traveling motors during traveling, stops the traveling motors with an error detected, determines a combination of traveling motors to improve a balance of driving force in a traveling direction which broke due to the stopping of the traveling motors, and as a control, based on the combination, in a case in which an error is detected in all of the traveling motors driving the wheels on one lateral side of the left lateral side and the right lateral side, continues driving the traveling motor associated with the wheel located on the traveling direction side and stops the traveling motor associated with the wheel located on an opposite side to the traveling direction, out of the traveling motors with no error detected, out of the traveling motors driving the wheels on the other lateral side to the one lateral side.

* * * * *